United States Patent [19]

Jewett

[11] 4,347,760
[45] Sep. 7, 1982

[54] LOCKING DIFFERENTIAL CONTROL SYSTEM

[75] Inventor: Mark D. Jewett, Livonia, Mich.

[73] Assignee: Massey-Ferguson, Inc., Detroit, Mich.

[21] Appl. No.: 115,469

[22] Filed: Jan. 25, 1980

[51] Int. Cl.³ .............................................. F16H 1/44
[52] U.S. Cl. ................................... 74/710.5; 74/711; 74/866; 192/4 A
[58] Field of Search ............... 74/752 D, 752 A, 866, 74/878, DIG. 6, 710.5, 711, 850; 192/4 A; 180/336

[56] References Cited

U.S. PATENT DOCUMENTS

| | | | |
|---|---|---|---|
| 2,730,182 | 1/1956 | Sloane | 180/6.44 |
| 2,830,670 | 4/1958 | Ferguson | 180/75 |
| 2,874,790 | 2/1959 | Hennessey | 74/710.5 |
| 2,922,482 | 1/1960 | Fisher | 180/45 |
| 3,025,722 | 3/1962 | Eger, Jr. et al. | 74/711 |
| 3,133,454 | 5/1964 | Paolo | 74/710.5 |
| 3,138,970 | 6/1964 | Costa et al. | 74/711 |
| 3,169,595 | 2/1965 | Shepherd | 74/711 |
| 3,288,232 | 11/1966 | Shepherd | 180/1 |
| 3,292,720 | 12/1966 | Harvey | 74/710.5 |
| 3,400,610 | 9/1968 | Taylor et al. | 74/710.5 |
| 3,439,785 | 4/1969 | Hughson | 192/4 |
| 3,463,277 | 8/1969 | Allori et al. | 74/710.5 |
| 3,467,212 | 9/1969 | Doll | 74/710.5 |
| 3,498,154 | 3/1970 | Müller-Berner | 74/710.5 |
| 3,706,351 | 12/1972 | Neisch | 180/76 X |
| 3,732,752 | 5/1973 | Louckes et al. | 74/710.5 |
| 3,845,671 | 11/1974 | Sharp et al. | 74/711 X |
| 3,974,717 | 8/1976 | Breed et al. | 74/710.5 |
| 4,156,547 | 5/1979 | Marsh | 74/711 |
| 4,157,467 | 6/1979 | Koeper | 235/92 CT |
| 4,218,938 | 8/1980 | Hattori | 74/710.5 |

Primary Examiner—C. J. Husar
Assistant Examiner—Lawrence J. Gotts
Attorney, Agent, or Firm—John C. Thompson

[57] ABSTRACT

A tractor locking differential (12, 18) is controlled by a solenoid operated hydraulic valve (34). The solenoid valve is in turn controlled by a logic circuit (36) which is responsive to signals received from a differential lock floor switch (32), application of brake lights (26) through the closing of a contact (28 or 30), and also from powering up the tractor. When the ignition (20) is turned on a flip-flop (50) within the circuit (36) will be cleared by action of a power up to clear circuit (58, 60, 64, 66) to dispose valve (34) in its unlocked position. After power up the operator can selectively lock or unlock the differential by application of momentary contact switch (32) which causes flip-flop (50) to toggle. When a brake light switch (28 or 30) is closed the flip-flop (50) will be cleared causing valve (34) to be disposed in its unlocked position.

13 Claims, 2 Drawing Figures

LOCKING DIFFERENTIAL CONTROL SYSTEM

FIELD OF THE INVENTION

The present invention relates generally to vehicles of the type provided with differentials that may be selectively locked or unlocked, and more particularly to a novel locking differential control system.

BACKGROUND ART

It is well known in the prior art to provide vehicles, such as farm tractors, with differentials which can be selectively locked or unlocked. It has also been long recognized that it is desirable to have the differential unlocked under certain conditions, as for example when applying the brakes, as the brakes are frequently employed when turning the tractor. One patent that teaches a control system for unlocking a selectively operable differential when the brakes are applied is U.S. Pat. No. 2,874,790 issued Feb. 24, 1959, to Hennessey. This patent further teaches that it is also desirable to unlock the differential when the ignition is turned off, or when turning. To accomplish the desired results an electric clutch unit is controlled by a plurality of series control switches. There are several disadvantages in this form of circuit. One disadvantage is that all leads and switches must be designed for carrying a current sufficient for the operation of the electric clutch unit. Another disadvantage of this form of circuit is that the contact switches of the current carrying type are relatively expensive and do not have the reliability as high as other components available today. A still further disadvantage of this design is that it is possible to start up the tractor when the differential is locked.

U.S. Pat. No. 3,706,351 issued Dec. 19, 1972, to Neisch and U.S. Pat. No. 3,845,671 issued Nov. 5, 1974, to Sharp et al both disclose the application of solid state logic elements to differential controls. However, neither of these patents disclose a system that permits the operator to control the differential while having certain circuits which override the operator controls to dispose the differential in an unlocked mode in certain conditions.

U.S. Pat. No. 3,732,752 to Louckes et al, issued in May, 1973, discloses the use of a manually operable pushbutton 66 to set an electromagnetic latch relay 68 for controlling a solenoid 46 and selectively locking a differential mechanism. A speed sensitive switch 62, in series with the latch, returns the differential to the unlocked state in high speed drive operation. However, no provision is made for the operator to disengage the latch, for the use of more reliable electronic latching components, or for automatic unlocking of the differential in the event of brake application of a power on condition.

OBJECTS AND SUMMARY OF THE INVENTION

It is an object of the present invention to provide a locking differential control system of low cost and relatively high reliability which will insure that the differential of the vehicle is unlocked whenever the vehicle is started up, or braked, and which can be controlled by the operator at other times.

The above object, and other objects and advantages of this invention are accomplished by providing a control of electromechanically operated differential locking mechanism which includes a flip-flop which can toggle between first and second output states to either cause the differential to be unlocked or locked, the flip-flop being provided with a clear input which, when receiving a clear signal, will cause the output to go to the first state, and clearing circuits interconnected with the clear input and operative to initiate a clear signal under certain operating conditions.

More specifically, a locking differential control system is provided for an operator controlled vehicle having first and second axle shafts driven through a differential and locking means capable of selectively locking the differential. The control system includes first and second operator controlled switching or signalling means capable of initiating signals in response to actuation by the operator, and a two state device coupled to the first and second operator controlled switching means and capable of being alternately switched between first and second states in response to successive actuation signals received from the first operator signalling means. The two state device provides an output signal having corresponding first and second states. The two state device is switched along with its output, to its first state in response to a signal received from the second operator controlled signalling means. An electromechanical transducer, preferably in the form of a solenoid operated hydraulic valve, is operatively interconnected with the locking means and connected to said output of the two state device. The valve is capable of causing the differential mechanism to be unlocked when said output is in its first state and to be locked when said output is in its second state.

The above and additional details are more fully set forth in the following detailed description and accompanying drawings.

DETAILED DESCRIPTION

Figure 1:
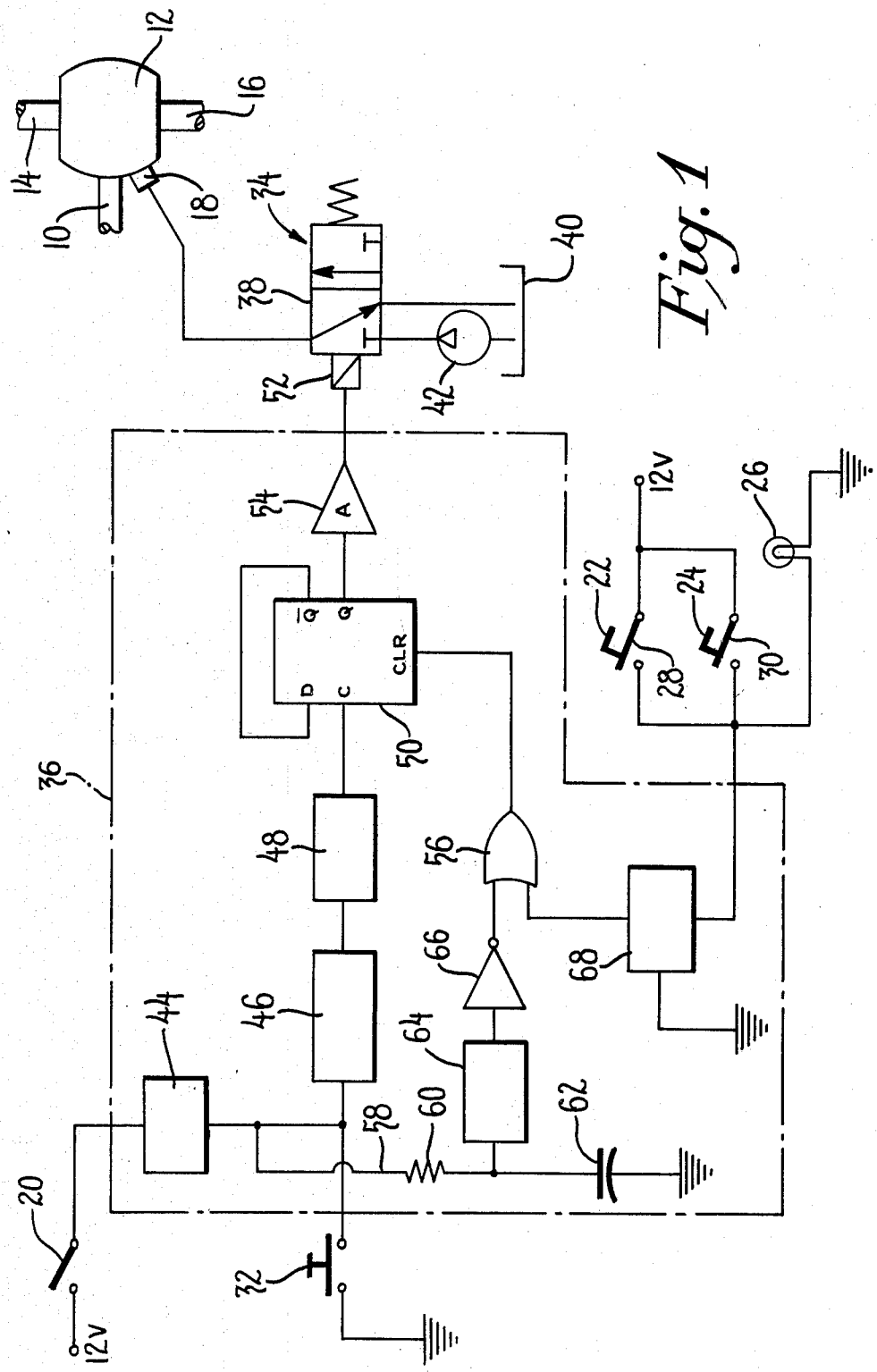
FIG. 1 is a functional representation of the present invention.

Referring first to FIG. 1 a portion of an operator controlled vehicle, such as an agricultural tractor, is illustrated. The vehicle includes a drive shaft 10 which acts through a differential 12 to drive right and left axle shafts 14, 16. The differential is of the locking type and thus is provided with locking means 18 capable of selectively locking or unlocking the differential. Since various forms of locking differentials are well known in the prior art, and since the locking differential control system of this invention may be applied to various forms of locking differentials, no specific form has been illustrated. However, in a preferred embodiment, ythe differential is provided with a clutch pack which will cause the axle shafts 14 and 16 to rotate together when the clutch pack is pressurized, and which will permit the shafts 14 and 16 to rotate at varying speeds when the clutch pack is not pressurized. The vehicle also includes various operator controls such as an ignition switch 20 which must be closed to power up the control circuit of this invention, and right and left brake pedals 22, 24. As is customary, the vehicle is also provided with a brake light circuit which will cause one or more brake lamps 26 to be lighted when a brake light switch 28 or 30 is closed. Each of the switches 28 and 30 will be closed whenever the associated brake pedal 22, 24 is applied.

The locking differential control system of this invention includes, in addition to the various elements set forth above, a differential lock floor switch 32 of the momentary contact type, an electromechanical transducer indicated generally at 34, and a control circuit indicated by the borken line 36. The electromechanical transducer utilized in a preferred embodiment is a two position three way solenoid control valve 38. When the valve 38 is in its normal position it will connect the clutch pack with reservoir 40 to permit differential action of the shafts 14 and 16. When the valve is shifted to its other position the output of a pump 42 will be directed to the clutch pack causing the shafts 14 and 16 to be operatively locked together. The circuit 36 is so designed that when it is interconnected to the various elements in the manner illustrated, the solenoid valve will be disposed in its non-locking or normal position when the vehicle is initially powered up. When the switch 32 is closed after power up, the valve will be caused to be switched from one position to the other. In addition, when the brake light switch 28 or 30 is closed the solenoid valve 38 will be disposed in its normal or unlocked position.

In FIG. 1 the control circuit is illustrated functionally and includes a 5 volt regulated power supply 44, a buffer 46, a monostable multivibrator 48 and a bistable circuit, specifically a D-type flip-flop 50 configured for toggling operation. The momentary contact switch 32 provides an operator controlled signal to monostable multivibrator 48 by way of buffer 46. The clock input of flip-flop 50 is connected to receive the output of multivibrator 48, and the output Q of the flip-flop drives a solenoid 52 of the valve 38 through an amplifier 54. The clear input, CLR, of the bistable circuit is connected to receive signals from a power up circuit and from the brake light circuit through an OR gate 56.

The power up circuit includes a series circuit 58 connected between the 5 volt power supply and ground, comprising a resistor 60 and a capacitor 62. A buffer 64 is connected at its input to the junction of the resistor 60 and capacitor 62, and provides its output to an inverter 66 whose output, in turn, provides one of the inputs to OR gate 56. The brake light circuit includes, in addition to the various elements set forth previously, a voltage divider 68, connected to receive an input of 12 volts whenever either switch 28 or 30 is closed. The output of voltage divider 68 provides the second input to OR gate 56.

The momentary contact switch 32 operating through the monostable multivibrator 48 may be considered a first operator controlled signalling means. By the same token, the power up circuit and the brake light circuit operating through the OR gate may be considered a second operator controlled signalling means.

Figure 2:
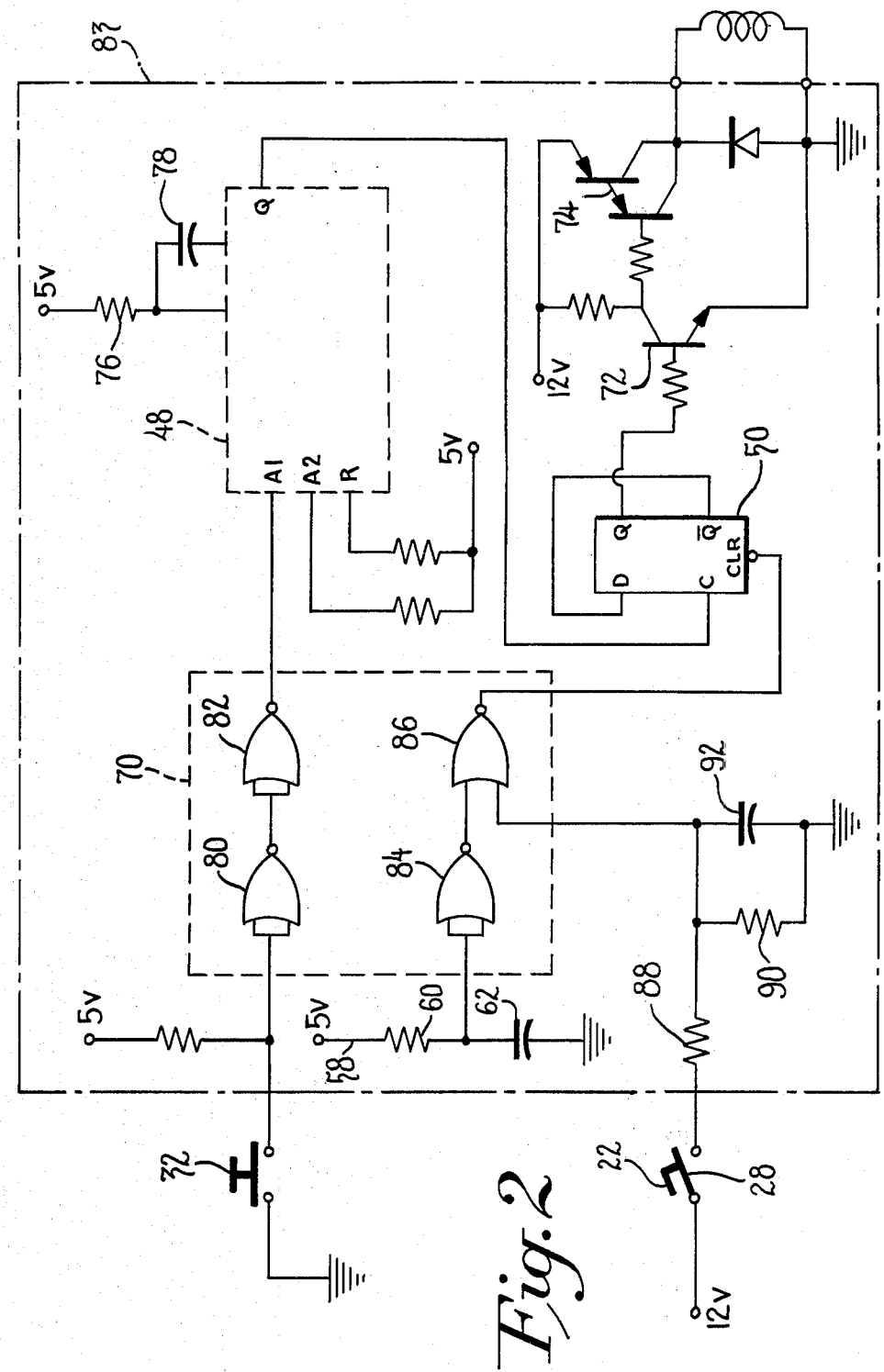
FIG. 2 is a schematic representation of a preferred electrical circuit utilized with this invention.

The circuit of FIG. 1 is realized by means of three integrated-circuit (IC) chips as shown in FIG. 2. Specifically, a quad NOR gate 70, a monostable multivibrator 48 and a D flip-flop 50 are commonly available as IC chip types 7402, 74121 and 7474, respectively. Additionally, a two stage power switching amplifier is provided, comprising a 2N3904 small signal NPN transistor 72 and a MJE700 Darlington PNP power transistor 74, to implement amplifier 54. The above components are provided for illustration only, and other circuit types may be utilized as known in the art.

The multivibrator has a low output in its stable state, but when triggered has a high output for a predetermined length of time which is regulated by a resistor 76 and a capacitor 78 to be approximately one-half second. When the momentary contact switch 32 is initially closed, the input A1 is brought low, and a light output pulse is triggered. The purpose of the two series connected NOR gates 80, 82 (which are part of the quad NOR gate 70) is to buffer the signal between the switch 32 and the input A1. The monostable multivibrator may not be retriggered until its output resumes the low state, and thus contact bounce of the switch 32 will not adversely affect the output of the circuit 36.

The output Q of the multivibrator 48 is connected to the clock input C of flip-flop 50. The output Q of the flip-flop is in turn coupled with amplifier circuit 72, 74. The NOT Q ($\overline{Q}$) output terminal and data input terminal (D) are interconnected with each other through a feedback loop. This causes the flip-flop's output Q to toggle when a pulse appears at C. The flip-flop is also provided with a clear input (CLR) which will always shift the output Q to a low value when a signal is applied to the clear input. Thus, in the preferred circuit 83, illustrated in FIG. 2, the flip-flop will be reset when a low signal is applied. However, a flip-flop could be employed which requires a high input to clear, this being illustrated in FIG. 1.

The circuit of FIG. 2 utilizes a pair of NOR gates 84, 86 in place of buffer 64, inverter 66, and OR gate 56 of FIG. 1. As will be recognized by those skilled in the art, however, NOR gates 84 and 86 perform the same logical function with respect to the inverting CLR input of FIG. 2 as do inverter 66 and OR gate 56 with respect to the non-inverting CLR input of FIG. 1.

It is desirable to reset the output Q of the flip-flop 50 to a low value and correspondingly to shift the solenoid valve to its off or normal position under certain situations. The first of these situations is when the vehicle is initially powered up. Specifically, when the ignition switch 20 is turned on there are transient voltages existing in the system for a very short interval of time. These voltages could set the output Q of the flip-flop 50 at either a high or low value. Therefore, it is necessary to provide circuitry which will cause output Q to be set at a low value when the vehicle is initially powered up. Additionally, during operation of the vehicle it is desirable that the differential lock valve be switched to its off position when the vehicle brakes are applied. This is particularly desirable in a farm tractor when either the left brake or the right brake may be applied independently of the other to facilitate turning.

To clear when powering up the vehicle, the 5 volt power supply is connected to ground through a resistor 60 in series with the capacitor 62. In the circuit shown in FIG. 2 the input leads of the NOR gate 84 are connected with the juncture between the resistors 60 and the capacitor 62. In this circuit the NOR gate acts as both the buffer and inverter. When the vehicle is initially powered up the voltage across the capacitor 62 will be low as the capacitor is charging causing the output of the NOR gate 84 to be initially high. The output of NOR gate 84 is connected with one of two input leads of the second NOR gate 86, causing the output of the second NOR gate to be low as the capacitor is charged. It should be appreciated that the capacitor 62 will become fully charged within a fraction of a second. However, the transient voltages within the circuit will dissipate before the capacitor becomes charged. Once the capacitor 62 is charged the input to the first of the NOR gates will be high causing its output to be low.

The other input lead to the second NOR gate 86 is connected to the tractor brake light switch 28 or 30. In normal operation the brake switches are open, causing the voltage on this input to have a low value. The output of the second NOR gate 86 will thus have a high voltage value after initial power up, as both of its inputs are low. When the input to the inverting CLR terminal of FIG. 2 is high it has no overriding effect upon the output Q of the flip-flop 50, which thus may remain either high or low. When the input to the inverting CLR terminal is low, however, the flip-flop is cleared, or reset, and Q is thus caused to transfer to a low value if initially high, and to remain low if initially low.

It is thus seen that when the tractor brakes are applied and the brake light switch is closed, the voltage on the second input lead at NOR gate 86 rises to a high value, causing the output of the gate to drop to a low level. As discussed above, a low level input to the inverting CLR terminal clears the flip-flop 50, overriding the clock input from the monostable multivibrator 48.

As the brake light circuit in the preferred embodiment is at 12 volts, it is necessary to provide a voltage divider circuit which includes resistors 88 and 90 and capacitor 92 to insure that the input voltage to the gate 86 is within acceptable limits when the switch 28 or 30 is closed.

As previously mentioned with respect to the circuits of FIGS. 1 and 2, an OR gate 56 is shown in FIG. 1 whereas a NOR gate 86 is illustrated in FIG. 2. The circuit shown in FIG. 1 will operate in the identical manner as the circuit in FIG. 2, with the sole difference of resetting the output Q by application of a high, rather than a low, input to the CLR input. However, if a flip-flop requiring a low input were used in the FIG. 1 embodiment it would be necessary to add an inverter after the OR gate 56. In this connection, it should be observed that an OR gate followed by an inverter is in fact a NOR gate. The buffer 64 and inverter 66 shown in FIG. 1 are the functional equivalent of the NOR gate 84 shown in FIG. 2.

While a preferred design in which the principles of the present invention have been incorporated is shown and described above, it is to be understood that the invention is not to be limited to the particular details, as shown and described above, but that, in fact, widely differing means may be employed in the practice of broader aspects of this invention. Thus, it would be possible to substitute a double throw toggle switch for the momentary contact switch illustrated at 32, and to utilize an RS flip-flop provided with a clear input in place or multivibrator 48 and flip-flop 50. Similarly, other operator controlled signalling means may be employed to initiate a clear signal in addition to the power up circuit and brake light circuit illustrated, such additional clearing signalling means being interconnected to additional leads of an OR gate. In addition, a stepping motor could be utilized to apply the locking mechanism within the differential instead of the hydraulic circuit shown in the drawings.

What is claimed is:

1. A locking differential control system for an operator controlled vehicle having first and second axle shafts driven through a differential, and locking means capable of selectively locking the differential, the control system being characterized by:
   first and second operator controlled signalling means capable of initiating signals in response to actuation by the operator;
   a two state device coupled to both the first and the second operator controlled signalling means and capable of alternately switching an output between first and second states in response to successive actuation signals received from the first operator signalling means, and to switch said output to its first state in response to a signal received from the second operator controlled signalling means; and
   an electromechanical transducer operatively interconnected with the locking means and connected to said output of the two state device and capable of causing the differential mechanism to be unlocked when said output is in its first state and to be locked when said output is in its second state.

2. The locking differential control system as set forth in claim 1 in which the two state device is a type D flip-flop configured for toggling operation.

3. The locking differential control system as set forth in claim 1 or claim 2 in which the first operator controlled signalling means includes a monostable multivibrator having its output connected to a clock input of the two state device.

4. The locking differential control system as set forth in claim 1 or claim 2 in which the first operator controlled signalling means includes a momentary contact switch.

5. The locking differential control system as set forth in claim 1 for an operator controlled vehicle additionally having selectively applied braking means, the second operator controlled signalling means being means responsive to the application of said braking means.

6. The locking differential control system as set forth in claim 1 in which the two state device is a flip-flop provided with clock and clear inputs, the first operator controlled signalling means having its output connected to the clock input of said flip-flop.

7. The locking differential control system as set forth in claim 6 in which said second operator controlled signalling means is a brake light circuit interconnected with the clear input of said flip-flop.

8. The locking differential control system as set forth in claim 6 or 7 in which the second operator controlled signalling means is a power up circuit interconnected with the clear input of said flip-flop.

9. The locking differential control system as set forth in claim 6 in which the second operator controlled signalling means includes a power up circuit and a brake light circuit connected to the clear input of said flip-flop through an OR gate.

10. A locking differential control system for an operator controlled vehicle having first and second axle shafts driven through a differential mechanism, selectively applied braking means, and locking means capable of selectively locking the differential mechanism; the control system comprising:
   bistable logic circuit means operable in first and second states, having first and second inputs, and providing an output signal switchable between first and second values corresponding to said first and second states, respectively;
   operator controlled signalling means connected to said first input for alternately switching said output between said first and second values;
   means responsive to application of said braking means and connected to said second input for causing said output signal to be either switched into or to remain in said first value when said circuit is in either said second or said first state, respectively; and an electromechanical transducer operatively interconnected with the locking means and connected to said output of the bistable logic circuit means and capable of causing the differential mechanism to be unlocked when said output is in its first value and to be locked when said output is in its second value.

11. A locking differential control system for an operator controlled vehicle having first and second axle shafts driven through a differential, and locking means capable of selectively locking the differential, the control system being characterized by:

first operator controlled signalling means capable of initiating a clock signal in response to actuation by the operator;

second operator controlled signalling means capable of initiating a clear signal in response to actuation by the operator, said second operator controlled signalling means including a power up circuit and a brake light circuit connected to the input leads of an OR gate;

a flip-flop having clock and clear inputs coupled to the first and second operator controlled signalling means, respectively, and capable of alternately switching an output between first and second states in response to successive actuation signals received from the first operator controlled signalling means, and to switch said output to its first state in response to a signal received from the second operator controlled signalling means; and an electromechanical transducer operatively interconnected with the locking means and connected to said output of the flip-flop and capable of causing the differential mechanism to be unlocked when said output is in its first state and to be locked when said output is in its second state.

12. The locking differential control system as set forth in claim 11 in which said first operator controlled signalling means includes a momentary contact switch coupled with a monostable multivibrator.

13. A locking differential control system for an operator controlled vehicle having first and second axle shafts driven through a differential, and locking means capable of selectively locking the differential, the control system being characterized by:

first and second operator controlled signalling means capable of initiating signals in response to actuation by the operator;

a single flip-flop provided with clock and clear inputs, the flip-flop being coupled to both the first and the second operator controlled signalling means and being capable of alternately switching an output between first and second states in response to successive actuation signals received from the first operator signalling means, and to switch said output to its first state in response to a signal received from the second operator controlled signalling means, the first operator controlled signalling means including a momentary contact switch coupled with a monostable multivibrator whose output is in turn coupled with the clock input of said flip-flop, the second operator controlled signalling means including a power up circuit and a brake light circuit connected to the clear input of said flip-flop through an OR gate; and an electromechanical transducer operatively interconnected with the locking means and connected to said output of the flip-flop and capable of causing the differential mechanism to be unlocked when said output is in its first state and to be locked when said ouput is in its second state.

* * * * *